US012679413B2

(12) United States Patent　(10) Patent No.:　US 12,679,413 B2
Quibriac et al.　(45) Date of Patent:　Jul. 14, 2026

(54) METHOD FOR HANDLING FAILURES IN AN AUTONOMOUS VEHICLE

(71) Applicant: Volvo Autonomous Solutions AB, Gothenburg (SE)

(72) Inventors: Yann Quibriac, Lyons (FR); Nicolas Perraud, Genas (FR)

(73) Assignee: Volvo Autonomous Solutions AB, Gothenburg (SE)

( * ) Notice: Subject to any disclaimer, the term of this patent is extended or adjusted under 35 U.S.C. 154(b) by 252 days.

(21) Appl. No.: 18/334,767

(22) Filed: Jun. 14, 2023

(65) Prior Publication Data

US 2023/0399022 A1　Dec. 14, 2023

(30) Foreign Application Priority Data

Jun. 14, 2022　(EP) .................................... 22178891

(51) Int. Cl.
　*B60W 60/00*　(2020.01)
　*B60W 40/13*　(2012.01)
　*B60W 50/02*　(2012.01)
(52) U.S. Cl.
　CPC ........ *B60W 60/0015* (2020.02); *B60W 40/13* (2013.01); *B60W 50/0205* (2013.01); *B60W 2530/10* (2013.01); *B60W 2530/20* (2013.01)
(58) Field of Classification Search
　CPC ............ B60W 60/0015; B60W 40/13; B60W 50/0205; B60W 2530/10; B60W 2530/20
　See application file for complete search history.

(56) References Cited

U.S. PATENT DOCUMENTS

| | | | | |
|---|---|---|---|---|
| 11,176,829 | B2 * | 11/2021 | Nemeth ............... | G05D 1/0022 |
| 2018/0052463 | A1 * | 2/2018 | Mays ................... | G07C 5/0808 |
| 2018/0259966 | A1 * | 9/2018 | Long ..................... | B60W 50/02 |
| 2019/0339698 | A1 * | 11/2019 | Badouin .............. | G05D 1/0061 |
| 2020/0150667 | A1 * | 5/2020 | Rakshit ................. | G01C 21/30 |
| 2020/0339151 | A1 * | 10/2020 | Batts ................... | B60W 50/029 |
| 2020/0391757 | A1 * | 12/2020 | Kim .................. | B60W 60/0055 |
| 2021/0048816 | A1 * | 2/2021 | Chi .......................... | G05D 1/65 |
| 2021/0300417 | A1 * | 9/2021 | Sarkar .............. | B60W 30/0956 |
| 2022/0009492 | A1 * | 1/2022 | Adwan .............. | B60W 40/105 |

(Continued)

FOREIGN PATENT DOCUMENTS

EP　　　　4006680 A1　6/2022

OTHER PUBLICATIONS

Extended European Search Report in corresponding European Application No. 22178891.2 dated Dec. 9, 2022 (5 pages).

*Primary Examiner* — Christopher George Fees
(74) *Attorney, Agent, or Firm* — Jeffri A. Kaminski; Venable LLP

(57)　　　　ABSTRACT

A method for handling failures in an autonomous vehicle is provided. The method comprises detecting a failure in the autonomous vehicle. The method further comprises determining whether the autonomous vehicle is in an open road area or in a restricted area. When the autonomous vehicle is determined to be in the restricted area, the method comprises handling the failure according to a restricted area configuration by determining whether a predetermined safety condition is fulfilled. When the predetermined safety condition is determined to be fulfilled, the method further comprises allowing the autonomous vehicle to leave the restricted area.

14 Claims, 5 Drawing Sheets

(56) References Cited

U.S. PATENT DOCUMENTS

2022/0048539 A1 *   2/2022   Stewart  ............... G01M 17/007
2022/0126872 A1      4/2022   Han et al.
2022/0171396 A1 *   6/2022   Lavrenyuk  ............. G05D 1/617
2022/0365530 A1 *  11/2022   Foster  ............... B60W 60/0015

* cited by examiner detecting a failure — 301.

comprises determining in the open road area or in the restricted area — 302.

obtaining a vehicle status information — 303.

handling the failure — 304.

determining predetermined safety condition fulfilled — 305.

allowing vehicle to leave the restricted area — 306.

restricting the vehicle from leaving — 307.

computer program

580

590 computer-readable
storage medium memory

570 processor

560

500 interface

70 control unit determining unit

502 detecting unit

501 obtaining unit

503 handling unit

504 allowing unit

505 restricting unit

506

70 control unit

METHOD FOR HANDLING FAILURES IN AN AUTONOMOUS VEHICLE

TECHNICAL FIELD

The invention relates to a control unit and a method for handling failures in an autonomous vehicle. The invention further relates to an autonomous vehicle, a computer program, and a computer program product.

The invention can be applied in heavy-duty vehicles, such as trucks, buses and construction equipment. Although the invention will be described with respect to an autonomous vehicle, the invention is also applicable to semi-autonomous vehicles.

BACKGROUND

For a vehicle driven by a user present in the vehicle, a decision of what to do when an alert is raised is taken by the user. The user may decide to drive to a nearest workshop, continue current tasks, or to abort current tasks and/or missions depending on information related to the alert. For autonomous vehicles, these decisions are typically handled by an autonomous module arbitrator when on open road, which typically deals with alerts by stopping the vehicle. Thus, handling failures severely reduces productivity of the vehicle.

Hence, there is an ongoing strive to improve productivity of handling failures in autonomous vehicles.

SUMMARY

An object of the invention is to improve the productivity of autonomous vehicles.

According to a first aspect, a method for handling failures in an autonomous vehicle. The method comprises:
  detecting a failure in the autonomous vehicle,
  determining whether the autonomous vehicle is in an open road area or in a restricted area,
  when the autonomous vehicle is determined to be in the restricted area, handling the failure according to a restricted area configuration, wherein handling the failure according to the restricted area configuration comprises determining whether a predetermined safety condition is fulfilled, and
  when the predetermined safety condition is determined to be fulfilled, allowing the autonomous vehicle to leave the restricted area.

A restricted area configuration as used herein may be a configuration of driving parameters of the autonomous vehicle when handling a failure detected in the restricted area. The restricted area configuration may for example relate to e.g., maximum/minimum allowed speed, maximum allowed acceleration, sensors needed to be active/functioning to continue operation, traffic regulations needed to be followed, etc.

Due to determining whether the autonomous vehicle is in an open road area or in a restricted area, the configuration used for handling the failure can be decided based on the area in which the autonomous vehicle is located. In other words, when it is determined that the autonomous vehicle is in the restricted area, the vehicle operates under some circumstances relating to the restricted area. For example, the restricted area may only have autonomous vehicles present and hence the autonomous vehicle may still, under some circumstances, operate even if failures occur.

Furthermore, as it is determined whether the predetermined safety condition is fulfilled, it is possible to determine whether it is safe to allow the autonomous vehicle to leave the restricted area. This is since the failure may be a minor failure and it may be determined that the autonomous vehicle will be able to finish a mission outside the restricted area before the failure becomes critical. Thus, due to handling the failure in a more flexible manner, the autonomous vehicle can be enabled to be productive even when handling failures.

Optionally, detecting the failure in the autonomous vehicle further comprises obtaining failure status information, and wherein determining whether the predetermined safety condition is fulfilled is based on the obtained failure status information.

The failure status information improves a confidence level of the determination of whether the predetermined safety condition is fulfilled. Thereby it is possible to determine that the predetermined safety condition is fulfilled for more types of failures, and thereby allowing the autonomous vehicle to be more productive by allowing the autonomous vehicle to leave the restricted area.

Optionally, the failure status information indicates a severity level of the detected failure, wherein the predetermined safety condition is considered fulfilled when the severity level of the failure is below a predetermined threshold.

A confidence level of the determination of whether the predetermined safety condition is fulfilled is thereby further improved, thereby further improving productivity.

Optionally, the failure status information indicates a critical time and/or critical distance of operating the autonomous vehicle until the severity level of the failure is expected to increase, wherein the predetermined safety condition is considered fulfilled when a drive plan of the autonomous vehicle is scheduled to finish before the indicated critical time and/or critical distance.

In other words, it is possible to determine that the autonomous vehicle can finish its tasks and drive outside the restricted area before the failure becomes a critical failure, and thereby improving productivity of the autonomous vehicle. By a drive plan as used herein may mean one or more tasks performed by the autonomous vehicle, e.g. by driving to one or more destinations in the restricted area and/or in the open road area.

Optionally, the method further comprises obtaining a vehicle status information, wherein determining whether the predetermined safety condition is fulfilled is based on the obtained vehicle status information.

The vehicle status information improves a confidence level of the determination of whether the predetermined safety condition is fulfilled. Thereby it is possible to determine that the predetermined safety condition is fulfilled for more types of failures, and thereby allowing the autonomous vehicle to be more productive by allowing the autonomous vehicle to leave the restricted area.

Optionally, the vehicle status information indicates a current weight of the autonomous vehicle, wherein the predetermined safety condition is considered fulfilled when the current weight is below a predetermined weight threshold.

In other words, it is possible to determine that the autonomous vehicle is not too heavy to safely drive outside the restricted area, and thereby allowing the autonomous vehicle to be more productive by allowing the autonomous vehicle to leave the restricted area.

Optionally, the vehicle status information indicates a current tire pressure of the autonomous vehicle, wherein the predetermined safety condition is considered fulfilled when the current tire pressure is above a predetermined tire pressure threshold.

In other words, it is possible to determine that the autonomous vehicle has a high enough tire pressure to safely drive outside the restricted area, and thereby allowing the autonomous vehicle to be more productive by allowing the autonomous vehicle to leave the restricted area.

Optionally, the vehicle status information indicates a current fuel and/or battery level, wherein the predetermined safety condition is considered fulfilled when the current fuel and/or battery level is/are above at least one predetermined fuel and/or battery level threshold.

In other words, it is possible to determine that the autonomous vehicle has a high enough current fuel and/or battery level to safely drive outside the restricted area, e.g. to be able to reach its destination without running out of fuel and/or electricity, and thereby allowing the autonomous vehicle to be more productive by allowing the autonomous vehicle to leave the restricted area.

Optionally, handling the failure according to the restricted area configuration comprises determining one or more driving parameters for the autonomous vehicle with a higher degree of freedom compared to handling the failure according to an open road configuration.

In other words, the restricted area configuration allows the autonomous vehicle to be more productive than if operating using an open road configuration as failures is handled with improved flexibility than in the open road configuration, which instead may cause the autonomous vehicle to stop for any failure.

Optionally, when the predetermined safety condition is determined to not be fulfilled, the method comprises restricting the autonomous vehicle from leaving the restricted area.

Optionally, when the predetermined safety condition is determined to not be fulfilled, the method comprises determining one or more driving parameters for the autonomous vehicle based on a severity of the detected failure. In other words, the autonomous vehicle may be adapted depending on the severity of the detected failure and thereby improve productivity as it is ensured that the autonomous vehicle can at least perform tasks allowable by the one or more driving parameters.

According to a second aspect, there is provided a control unit to perform the method according to the first aspect. The control unit may be an electronic control unit.

According to a third aspect, there is provided an autonomous vehicle comprising the control unit according to the second aspect.

According to a fourth aspect, there is provided a computer program comprising program code means for performing the method according to the first aspect, when said program is run on a computer.

According to a fifth aspect, there is provided a computer program medium carrying a computer program comprising program code means for performing the method according to the first aspect, when said program is run on a computer.

All aspects have corresponding advantages and/or features as the advantages and/or features mentioned with respect to the first aspect. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
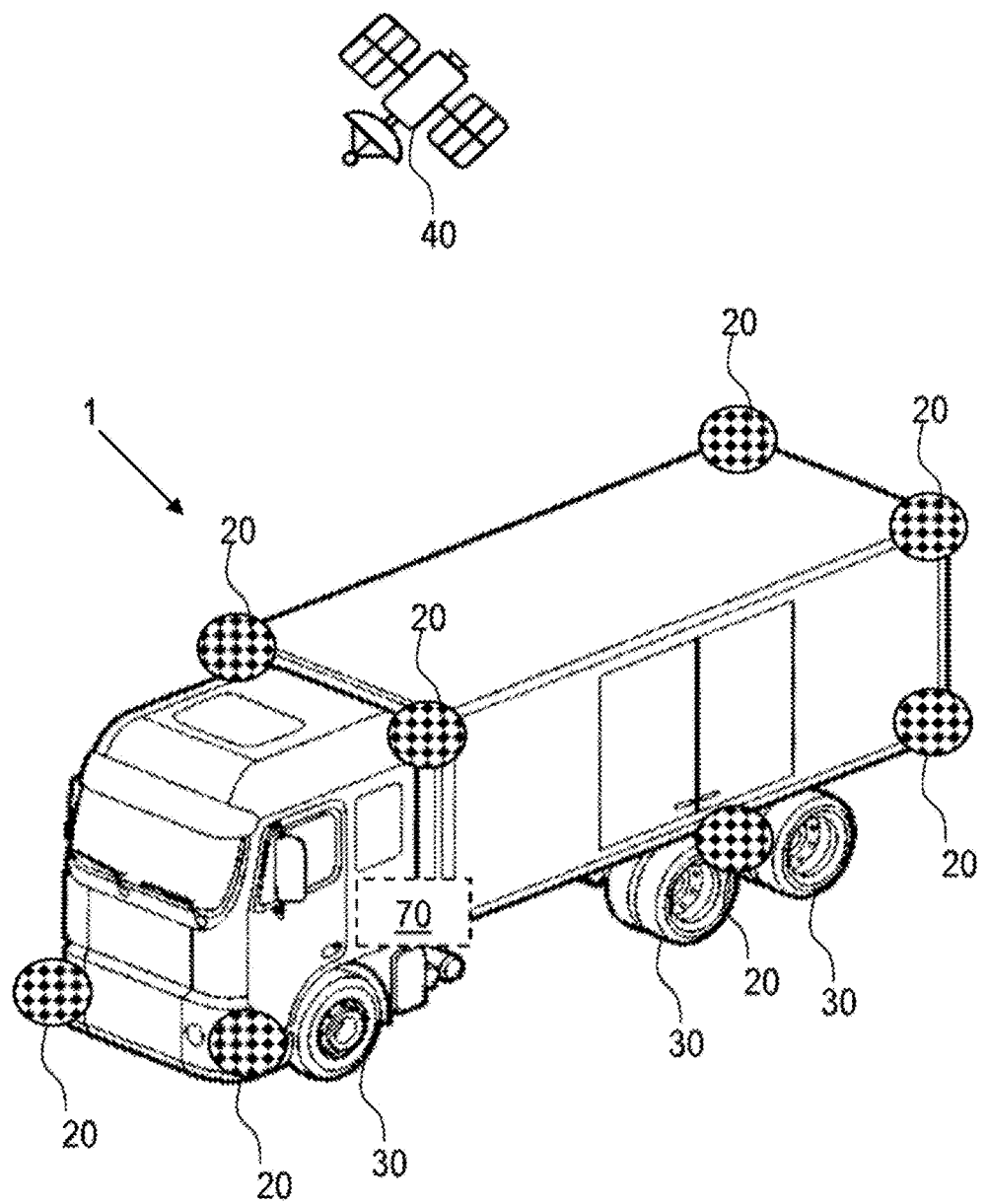
FIG. 1 is a schematic overview of an autonomous vehicle.

FIG. 1. is a schematic overview of an autonomous vehicle 1 in accordance with embodiments herein. Embodiments herein relates to handling failures in the autonomous vehicle 1. Failure as used herein may mean any error, warning, fault, or other indication that the autonomous vehicle 1 is and/or will not work optimally. The autonomous vehicle 1 may be any autonomous or semi-autonomous vehicle, e.g. a car, truck, bus, heavy-duty vehicle, wheel loader, etc. The autonomous vehicle 1 comprises wheels 30. The autonomous vehicle 1 may comprise a set of sensors 20 mounted at any suitable location(s) of the autonomous vehicle 1. The set of sensors 20 comprise at least one sensor. The set of sensors 20 may comprise at least one sensor which senses failures relating to the autonomous vehicle 1. The set of sensors 20 may comprise at least one sensor which detects failures in the autonomous vehicle 1. Further examples of detectable failures may comprise: air pressure sensor for air leakage from a braking or suspension system of the autonomous vehicle 1, a battery sensor indicating a poor battery health, e.g., below a predetermined threshold, a temperature sensor and/or a cooling level fluid sensor indicating a too high temperature, e.g. above a predetermined threshold. The set of sensors 20 may further comprise at least one sensor which detects vehicle status information. For example, a sensor in the set of sensors 20 may be able to determine the tire pressure of any one or more tires on the wheels 30. The autonomous vehicle 1 may be capable of determining its current location, e.g. whether it is present in a restricted area and/or an open area. The autonomous vehicle 1 may be able to locate itself by any suitable positioning method. For example, the autonomous vehicle 1 may locate itself using at least one satellite 40, e.g. using a Global navigation satellite system (GNSS) such as e.g. Global Positioning System (GPS). The set of sensors 20 may also comprise one or more sensors which can be used for positioning the autonomous vehicle 1.

Embodiments herein may be performed by a control unit 70. The control unit 70 may be comprised in the autonomous vehicle 1 but may also be comprised in any other suitable location communicatively coupled with the autonomous vehicle 1, e.g., in a remote cloud environment.

Figure 2:
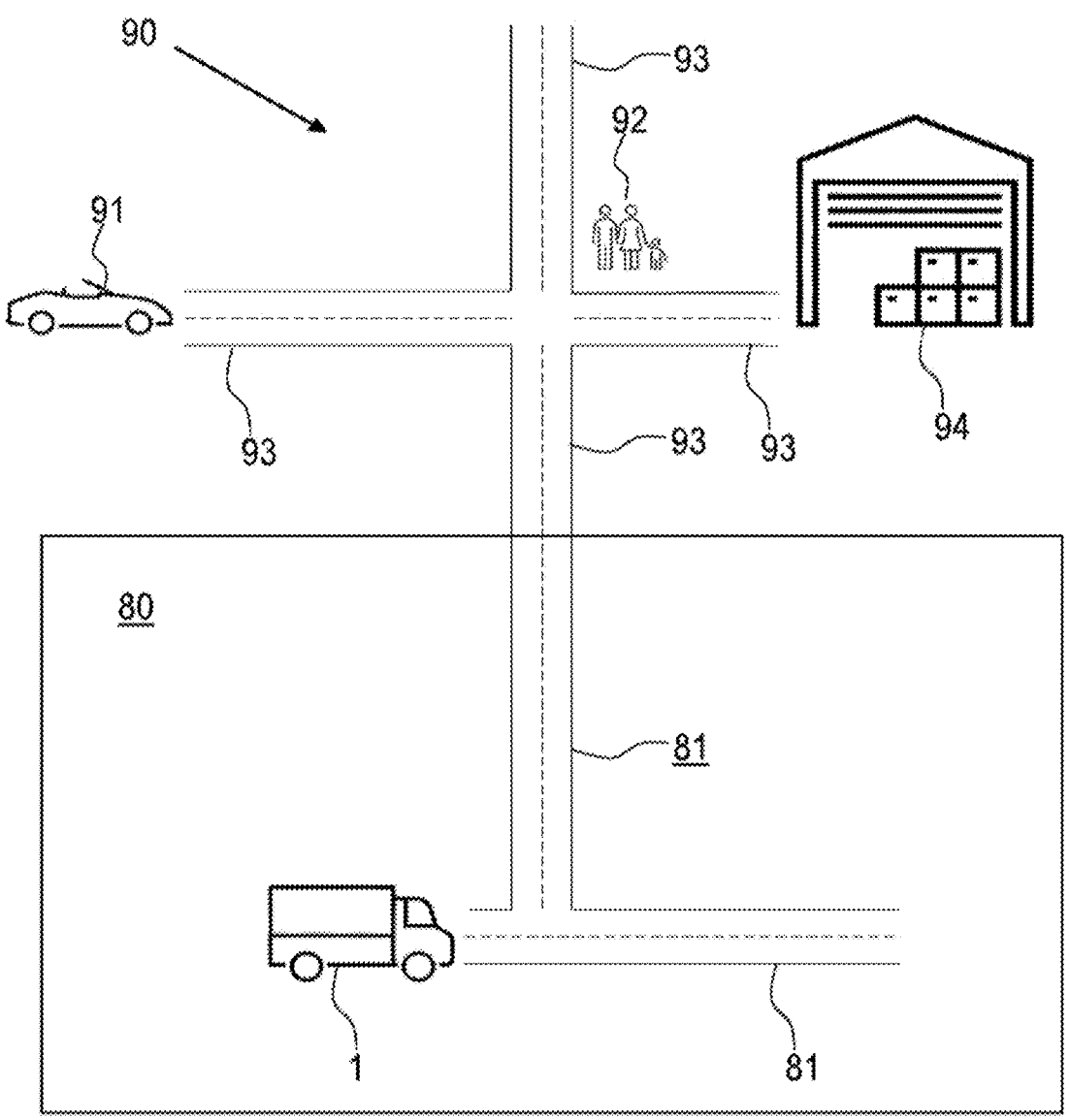
FIG. 2 is a schematic overview of an autonomous vehicle in a restricted area.

FIG. 2. is a schematic overview of the autonomous vehicle 1 in a restricted area 80. The restricted area 80 may be a predefined region in which the autonomous vehicle 1 may operate. The restricted area 80 may comprise closed roads 81 which the autonomous vehicle 1 travels to perform one or more tasks, also referred to as missions or drive plans. The closed roads 81 may also be any type of path which the autonomous vehicle 1 can use. Operating the autonomous vehicle 1 in the restricted area 80 may be associated with a restricted area configuration. The restricted area 80 may be isolated from an open road area 90. The restricted area 80 may for example be a geofenced area such that it is possible to determine by the location of the autonomous vehicle 1 whether the autonomous vehicle 1 is in the restricted area 80 or whether the autonomous vehicle 1 is in the open road area 90. It may also be possible to detect whether the autonomous vehicle 1 is in the restricted area 80 by tracking an operation of the autonomous vehicle 1 such as entry and exit of the autonomous vehicle 1 in the restricted area 80, e.g. by having sensors arranged at entrances, e.g. gates, between the restricted area 80 and the open road area 90 which detects when the autonomous vehicle 1 enters or leaves the restricted area 80. The restricted area 80 may have predetermined conditions, e.g. any one of only autonomous vehicles are present, no vulnerable road users are present, only the autonomous vehicle 1 is present, only vehicles are present, other safety mechanisms to isolate autonomous vehicles from vulnerable road users are present, etc. In other words, in the restricted area 80, there may be no or few regulations to comply with, e.g., weight limitations, speed regulations, etc.

The open road area 90 may comprise open roads 93 which the autonomous vehicle 1 travels to perform the one or more tasks, e.g. as part of tasks partially performed in the restricted area. The open roads 93 may also be any type of path which the autonomous vehicle 1 can use. In other words, the autonomous vehicle 1 may be configured to perform tasks partially in the restricted area 80 and in the open road area 90, e.g. by transporting goods between the areas. The open road area 90 may comprise any suitable entity, e.g. a second vehicle 91, pedestrians 92, and a warehouse 94. Thus, the open road area 90 is less predictable than the restricted area 80. Operating the autonomous vehicle 1 in the restricted area 80 may be associated with a restricted area configuration for the autonomous vehicle 1. Operating the autonomous vehicle 1 in the open road area 90 may be associated with an open road configuration for the autonomous vehicle 1 different from the restricted area configuration. For example, the restricted area configuration may provide a higher degree of freedom of handling failures than the open road configuration. As an example, when the autonomous vehicle 1 is configured with the restricted area configuration, it may be determined that even though failures are detected, the autonomous vehicle 1 may continue driving and finish its tasks if a predetermined safety condition is met. The restricted area configuration may additionally or alternatively also relate to more relaxed speed limits, i.e. higher maximum speed limits, when operating in the restricted area 80. The autonomous vehicle 1 may perform one or more tasks which requires operating in both of the restricted area 80 and the open road area 90, e.g. the autonomous vehicle 1 may transport goods from the restricted area 80 to the warehouse 94. In some embodiments, when the autonomous vehicle 1 initiates performing the one or more tasks in the restricted area 80, the tasks will be carried out under the restricted area configuration, e.g. with respect to failure handling, even when leaving the restricted area 80 to drive in the open road area 90.

Some regulations, e.g. traffic rules, safety regulations etc., may apply to the open road area 90 but may not apply to the restricted area 80. In this way it may be possible for the restricted area configuration to be more permissive than the open road configuration. As an example, when some lights do not work on the autonomous vehicle 1, it may be acceptable to drive in the restricted area 80 but not allowed on the open road 90. Furthermore, it may also be allowed to drive when overloaded in the restricted area 80 but not on the open road area 90. Driving with a very low vehicle speed may also be allowed in the restricted area 80 but not on at least some of the roads in the open road area 90.

Embodiments herein may relate to handing failures of the autonomous vehicle 1 differently depending on a position of the autonomous vehicle 1, e.g. in the open road area 90 vs in the restricted area 80. In the open road area 90, normal fault handling occurs, e.g. as typically provided for autonomous vehicles such as performing emergency stops when failures are detected. In the restricted area 80, a larger possibility for the autonomous vehicle 1 to operate, e.g. with a downgraded speed and/or torque maximum limit, and/or a limit for an engine run time, is provided. For example, the autonomous vehicle 1 may under some conditions travel in the restricted area 80 even when a severe failure is detected. To allow the autonomous vehicle 1 to leave the restricted area 80 to the open road area 90 in autonomous mode, a predetermined safety condition may need to be fulfilled. The predetermined safety condition may be considered fulfilled when any one or more out of the following conditions are fulfilled:

No severe failure,

Service alerts have a solved resolution plan,

Weight of the autonomous vehicle 1 is below a regulation weight,

Tire pressure of the autonomous vehicle 1 is above a minimum regulatory pressure level, e.g. to optimize energy consumption, and Fuel and/or battery level of the autonomous vehicle 1 must be above a minimum level either to complete the mission or a reload area being identified, e.g. such that the autonomous vehicle 1 have time to refuel and/or recharge during its mission.

Figure 3:
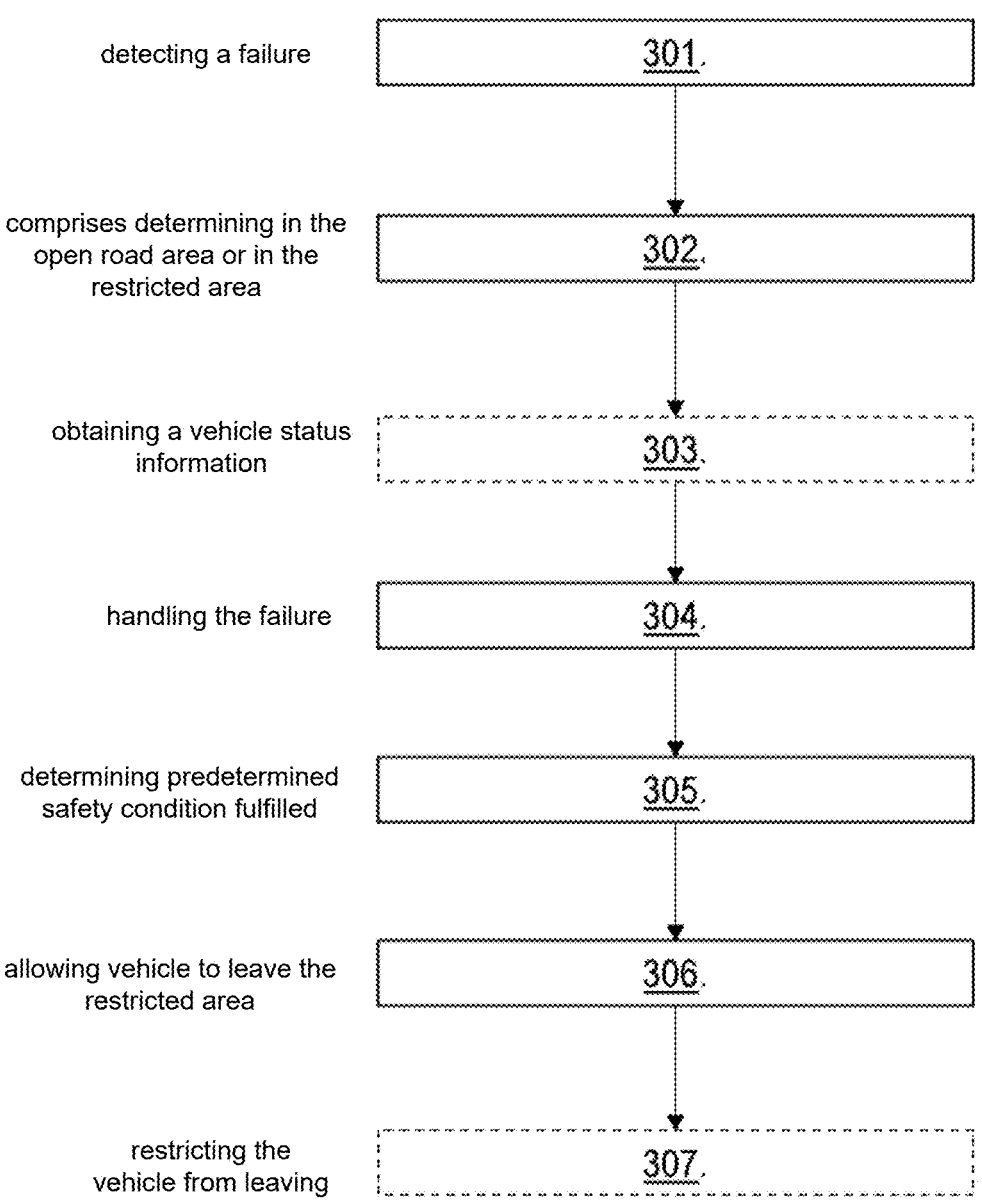
FIG. 3 is a flowchart illustrating a method according to embodiments herein.

FIG. 3 illustrates a method for handling failures in the autonomous vehicle 1. The method comprises the following actions described below, which actions may be taken in any suitable order. Optional actions are indicated by dashed boxes in FIG. 3.

Action 301

The method comprises detecting a failure in the autonomous vehicle 1. The detected failure may be any one or more error, warning, fault, or other indication that the autonomous vehicle 1 is and/or will not work optimally. For example, the failure may indicate any one or more out of: low fuel level, e.g., below a predetermined threshold, air leakage, tire pressure below a predetermined threshold, brake bulb failure, fuse blown, sensor failures, high temperatures above a predetermined threshold, etc.

Detecting the failure in the autonomous vehicle 1 may further comprise obtaining failure status information, e.g. indicating details and/or current status of the failure.

The failure may be detected by any suitable means. For example, the failure may be detected by the autonomous vehicle 1 itself, e.g. by the use of the set of sensors 20 in the autonomous vehicle 1. Alternatively or additionally, detecting the failure may comprise receiving an indication from another entity, e.g. another vehicle observing that there is a failure with the autonomous vehicle 1. Alternatively or additionally, a measuring entity such as a weighing station may detect that the autonomous vehicle 1 is overloaded.

Action 302

The method comprises determining whether the autonomous vehicle 1 is in the open road area 90 or in the restricted area 80. A position of the autonomous vehicle 1 may be determined by using the at least one satellite 40 and/or the set of sensors 20.

Determining whether the autonomous vehicle 1 is in the open road area 90 or in the restricted area 80 may comprise comparing the position of the autonomous vehicle 1 to a map and/or coordinates indicating the restricted area 80. Additionally or alternatively, the position of the autonomous vehicle 1 may be compared with a geofence of the restricted area 80 and/or the open road area 90.

Action 303

The method may further comprise obtaining a vehicle status information, i.e., a current state of the autonomous vehicle 1 which may affect handling the detected failure. The vehicle status information may be obtained/measured by the autonomous vehicle 1 itself, e.g. by the use of the set of sensors 20 in the autonomous vehicle 1. Additionally or alternatively, obtaining the vehicle status information may comprise receiving an indication from another entity, e.g. another vehicle observing the vehicle status information and/or a measuring entity such as a weighing station detecting the vehicle status information, e.g. weight of the autonomous vehicle 1.

In some embodiments, the vehicle status information may indicate any one or more out of:
  a current weight of the autonomous vehicle 1,
  a current tire pressure of the autonomous vehicle 1, and
  a current fuel and/or battery level.

Action 304

When the autonomous vehicle 1 is determined to be in the restricted area, the method comprises, handling the failure according to a restricted area configuration. The restricted area configuration may be different from an open road configuration.

In some embodiments, handling the failure according to the restricted area configuration comprises determining one or more driving parameters e.g., maximum/minimum allowed speed, maximum allowed acceleration, sensors needed to be active/functioning to continue operation, traffic regulations needed to be followed, for the autonomous vehicle 1 with a higher degree of freedom compared to handling the failure according to an open road configuration. The higher degree of freedom may relate to allowing the autonomous vehicle to operate, e.g. in a downgraded state, even if there is a failure detected.

Action 305

The method comprises determining whether a predetermined safety condition is fulfilled. For example, when the failure is a minor failure or merely an indication of a potential future failure, the predetermined safety condition may be considered fulfilled. Additionally or alternatively, the predetermined safety condition may be considered fulfilled when the failure is not related to an emergency failure, also referred to as a red alert.

Determining whether the predetermined safety condition is fulfilled may be based on the obtained failure status information. For example, for failures associated with a certain status, e.g. indicating that service is soon needed for the autonomous vehicle 1, the predetermined safety condition may be considered fulfilled. For failures associated with another status, e.g. indicating a more severe failure, the predetermined safety condition may be considered fulfilled.

In some embodiments, the failure status information indicates a severity level of the detected failure. The predetermined safety condition is in these embodiments considered fulfilled when the severity level of the failure is below a predetermined threshold. In other words, the detected failure is mapped to a certain severity level e.g. using a database or lookup table. The detected failure may be reported as having a certain severity level, e.g. by the set of sensors 20, and/or evaluated to be at a certain severity level depending on the detected failure.

In some embodiments, the failure status information indicates a critical time and/or critical distance of operating the autonomous vehicle 1 until the severity level of the failure is expected to increase. These failures may also be referred to as service alerts or yellow alerts. In these embodiments the predetermined safety condition is considered fulfilled when a drive plan of the autonomous vehicle 1 is scheduled to finish before the indicated critical time and/or critical distance. In other words, the failure status information may indicate that the autonomous vehicle has a problem which will soon and/or within a certain driven distance become severe. However, the predetermined safety condition is considered fulfilled as the failure may presently only be a minor failure, and the autonomous vehicle 1 may thus finish its tasks before the failure becomes critical. For example, the failure status indication may indicate that the brakes are in need of service in X number of miles/kilometres and that the autonomous vehicle 1 is not allowed to drive after those X number of miles/kilometres. The autonomous vehicle 1 may have time to finish its drive plan and drive to a service station all within the X number of miles/kilometres, and therefore the predetermined safety condition is considered fulfilled.

In some embodiments, the method comprises determining whether the predetermined safety condition is fulfilled is based on the obtained vehicle status information. For example, it may be determined if the autonomous vehicle 1 capable of handling the detected failure in the open road area 90 given its current state and/or regulations of the open road area.

In some embodiments, the predetermined safety condition is considered fulfilled when any one or more out of:
  the current weight is below a predetermined weight threshold, i.e., the autonomous vehicle is not overloaded,
  the current tire pressure is above a predetermined tire pressure threshold, i.e., the current tire pressure is acceptable for driving longer distances, and
  the current fuel and/or battery level is/are above at least one predetermined fuel and/or battery level threshold, e.g., the current fuel and/or battery level is/are sufficient for finishing a mission/drive plan.

In some embodiments, the predetermined safety condition comprises a plurality of conditions, e.g. any one or more out of the embodiments and examples of the predetermined safety condition herein. In these embodiments, the predetermined safety condition is considered fulfilled only if all out of the plurality of conditions are fulfilled.

Action 305 may be performed as part of handling the failure according to the restricted area configuration as in Action 304.

Action 306

When the predetermined safety condition is determined to be fulfilled, the method comprises allowing the autonomous vehicle 1 to leave the restricted area 80. Allowing the autonomous vehicle 1 to leave the restricted area 80 may comprise indicating to the autonomous vehicle 1 that it is allowed to leave the restricted area 80. Additionally or alternatively, allowing the autonomous vehicle 1 to leave the restricted area 80 may comprise triggering an opening of a gate between the open road area 90 and the restricted area 80. Additionally or alternatively, allowing the autonomous vehicle 1 to leave the restricted area 80 may comprise reconfiguring the autonomous vehicle 1.

Allowing the autonomous vehicle 1 to leave the restricted area 80 may mean that the autonomous vehicle 1 is allowed to continue operating with its restricted area configuration and continue outside the restricted area 80, e.g. without changing configuration. This allows the autonomous vehicle 1 to be productive even in view of the detected failure. This is possible as it has been determined that the predetermined safety condition is fulfilled and thereby the autonomous vehicle operates safely outside of the restricted area 80.

Action 307

In some embodiments, when the predetermined safety condition is determined to not be fulfilled, the method comprises restricting the autonomous vehicle 1 from leaving the restricted area 80. In some of these embodiments, the autonomous vehicle 1 may still operate and thereby be productive. In some of these embodiments, the autonomous vehicle 1 may be configured into a downgraded mode. This may for example comprise configuring the autonomous vehicle 1 to any one or more out of:

a reduced maximum speed limit, a reduced maximum torque, turning on at least one warning light and/or at least one beacon of the autonomous vehicle 1.

As another example of a downgraded mode, the autonomous vehicle may be configured to not be allowed to pull a trailer and/or to have a set maximum allowed engine temperature.

In some embodiments, when the predetermined safety condition is determined to not be fulfilled, the method may comprise determining one or more driving parameters for the autonomous vehicle 1 based on a severity of the detected failure. The one or more driving parameters may be driving parameters for the downgraded mode.

In some of these embodiments, when the severity of the detected failure is too high, e.g. the severity level being above a predetermined threshold, the autonomous vehicle 1 may be halted, e.g. triggered to performed an emergency stop.

Figure 4:
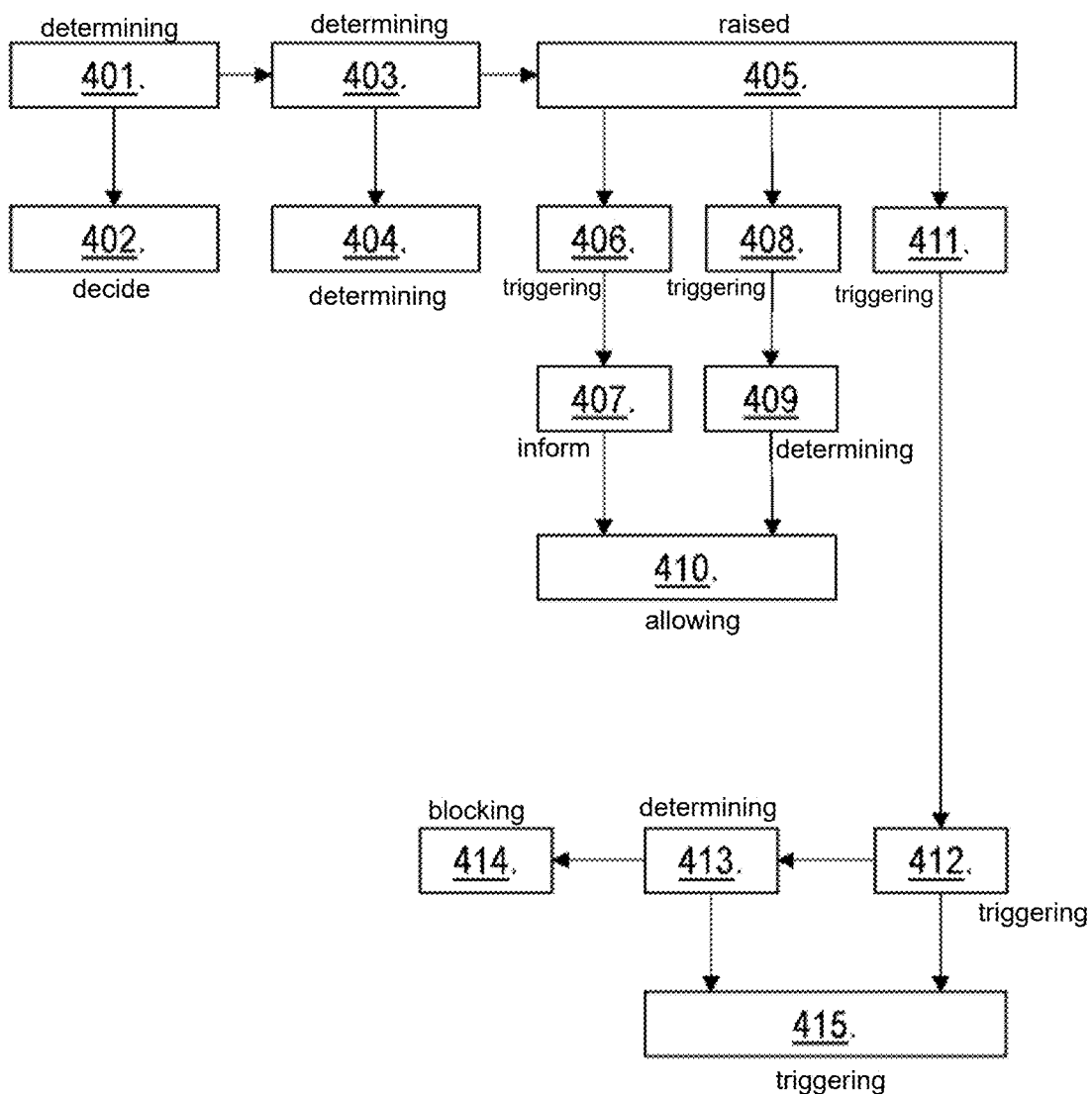
FIG. 4 is a flowchart illustrating an example scenario according to embodiments herein.

FIG. 4 illustrates an example method for handling a failure in a vehicle, e.g. the autonomous vehicle 1. The vehicle may be an autonomous truck. The example method comprises the following actions described below, which actions may be taken in any suitable order. Any one or more of the actions presented in FIG. 4 may be combined in any suitable manner and/or order with any one or more out of the actions 301-307 presented above.

The method may first comprise determining 401 whether a vehicle, e.g. the autonomous vehicle 1, is an autonomously driven truck. When it is determined that the vehicle is not autonomous, a driver of the vehicle may decide 402 how to handle the failure based on his or her own experience.

When it is determined that the vehicle is autonomous, e.g. it is the autonomous vehicle 1, the method comprises determining 403 whether the vehicle is in a closed area e.g. a fenced/geo-fenced area, such as the restricted area 80. GPS may be used for positioning the vehicle. When it is determined that the vehicle is not in a closed area, e.g. the vehicle is in the open road area 90, the method comprises determining 404 how to handle the failure and/or to how to operate the autonomous vehicle 1 based on standard autonomous vehicle truck legacy rules or configurations.

When it is determined that the autonomous vehicle 1 is in a closed area, e.g. the autonomous vehicle 1 is in the restricted area 80, different errors, warnings, failure indicators etc. may be raised 405 when a failure is detected by the vehicle.

For example, the method may comprise triggering 406 an information indicator when detecting a failure, e.g. a failure which is only intended to inform 407 the autonomous vehicle 1 of some potential or future issue.

For example, the method may comprise triggering 408 a service alert also referred to as a yellow alert when detecting a medium or minor failure in the autonomous vehicle 1. The method may further comprise determining 409 whether the drive plan is safe to use for the open road, e.g. as in action 305.

The method may further comprise allowing 410 the autonomous vehicle 1 to drive on an open road, e.g. the open road area 90 if weight, fuel/battery level and/or tire pressure of the autonomous vehicle 1 is within acceptable predetermined thresholds, e.g. as in action 306.

Allowing 408 the autonomous vehicle 1 to drive in the open road area may be in response to triggering 406 the information indicator, informing 407 the autonomous vehicle 1 of some potential or future issue, and/or in response to determining 409 whether the drive plan is safe to use for the open road.

For example, the method may comprise triggering 411 an emergency alert, also referred to as a red alert, e.g. when a severe failure is detected. The method may further comprise triggering 412 an impact and severity failure arbitrator, which determines whether or not the detected failure is of high or low impact severity. When it is determined that the detected failure is of high impact severity, the method comprises determining 413 whether an overriding mode of the vehicle 1 is activated. The overriding mode may relate to a user, taking responsibility/control over the autonomous vehicle 1 due to the high impact severity failure. When the overriding mode is not activated, the method comprises blocking 414 the autonomous vehicle 1. When the overriding mode is activated, triggering 415 the autonomous vehicle 1 to drive in a downgraded mode, e.g. as in action 307. The autonomous vehicle 1 may only drive in the downgraded mode within the closed area, e.g. the restricted area 80. The downgraded mode may relate to limiting speed or torque but may also relate to triggering a warning light or beacon of the vehicle.

To perform the method actions described herein, the control unit 70 may be configured to perform any one or more of the above actions 301-307, 401-416, and/or any of the other examples or embodiments herein. The control unit 70 may for example comprise an arrangement depicted in FIGS. 5a and 5b.

The control unit 70 may comprise an input and output interface 500 configured to communicate with any necessary components and/or entities of embodiments herein. The input and output interface 500 may comprise a wireless and/or wired receiver (not shown) and a wireless and/or wired transmitter (not shown). The control unit 70 may be arranged in any suitable location of the vehicle 1. The control unit 70 may use the input and output interface 400 to control and communicate with sensors, actuators, subsystems, and interfaces in the vehicle 1 by using any one or more out of: Controller Area Network (CAN), ethernet cables, wireless, and/or other network interfaces.

The control unit 70 may be configured to, e.g. by means of a detecting unit 501 comprised in the control unit 70, detect a failure in the autonomous vehicle 1.

The control unit 70 may be configured to, e.g. by means of the detecting unit 501 comprised in the control unit 70, detect the failure in the autonomous vehicle 1 by obtaining failure status information.

The control unit 70 may be configured to, e.g. by means of a determining unit 502 comprised in the control unit 70, determine whether the autonomous vehicle 1 is in the open road area 90 or the restricted area 80.

The control unit 70 may be configured to, e.g. by means of an obtaining unit 503 comprised in the control unit 70, obtain a vehicle status information.

The control unit 70 may be configured to, e.g. by means of a handling unit 504 comprised in the control unit 70, when the autonomous vehicle 1 is determined to be in the restricted area, handle the failure according to a restricted area configuration.

The control unit 70 may be configured to, e.g. by means of the handling unit 504 comprised in the control unit 70, handle the failure according to the restricted area configuration by determining one or more driving parameters for the autonomous vehicle 1 with a higher degree of freedom compared to handling the failure according to an open road configuration.

The control unit 70 may be configured to, e.g. by means of the determining unit 502 comprised in the control unit 70, determine whether a predetermined safety condition is fulfilled. The control unit 70 may be configured to perform the determination of whether the predetermined safety condition is fulfilled, as part of being configured to handle the failure according to the restricted area configuration.

The control unit 70 may be configured to, e.g. by means of the determining unit 502 comprised in the control unit 70, determine whether the predetermined safety condition is fulfilled based on the obtained vehicle status information.

The control unit 70 may be configured to, e.g. by means of the determining unit 502 comprised in the control unit 70, determine whether the predetermined safety condition is fulfilled based on the obtained failure status information.

The control unit 70 may be configured to, e.g. by means of an allowing unit 505 comprised in the control unit 70, when the predetermined safety condition is determined to be fulfilled, allow the autonomous vehicle 1 to leave the restricted area 80.

The control unit 70 may be configured to, e.g. by means of a restricting unit 506 comprised in the control unit 70, when the predetermined safety condition is determined to not be fulfilled, restrict the autonomous vehicle 1 from leaving the restricted area 80.

The control unit 70 may be configured to, e.g. by means of the determining unit 502 comprised in the control unit 70, when the predetermined safety condition is determined to not be fulfilled, determine one or more driving parameters for the autonomous vehicle 1 based on a severity of the detected failure.

Figures 5A, 5B:
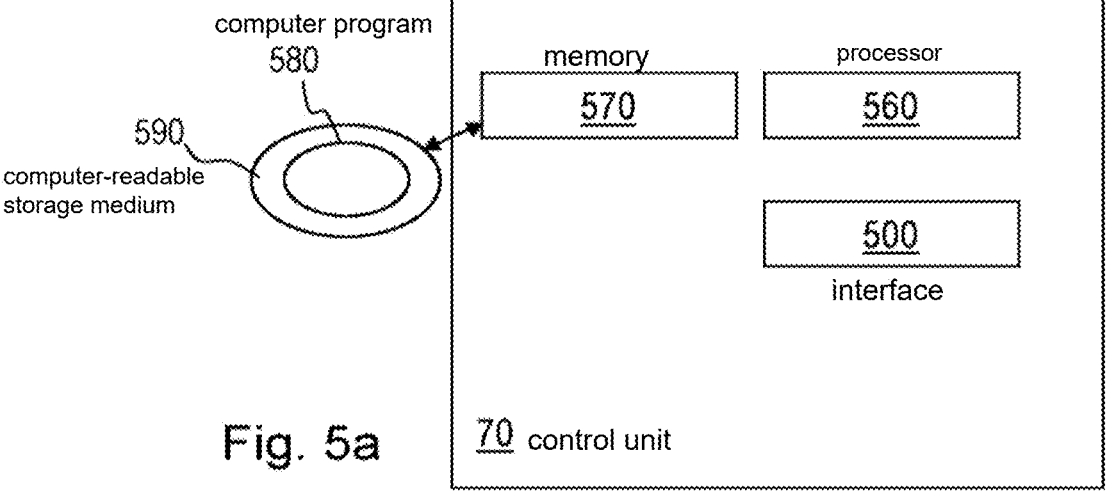
FIG. 5a-5b are schematic block diagrams illustrating a control unit according to embodiments herein.

The embodiments herein may be implemented through a processor or one or more processors, such as the processor 560 of a processing circuitry in the control unit 70 depicted in FIG. 5*a*, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 570 comprising one or more memory units. The memory 570 comprises instructions executable by the processor in control unit 70. The memory 570 is arranged to be used to store e.g. information, indications, data, configurations, sensor data, positioning information, scanned surroundings of the autonomous vehicle 1, drive plans, and applications to perform the methods herein when being executed in the control unit 70.

In some embodiments, a computer program 580 comprises instructions, which when executed by a computer, e.g. the at least one processor 560, cause the at least one processor of the control unit 70 to perform the actions 301-307 above.

In some embodiments, a computer-readable storage medium 590 comprises the respective computer program 580. The computer-readable storage medium 590 may comprise program code for performing the steps of any one of actions 301-307 above when said program product is run on a computer, e.g. the at least one processor 560.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims. Furthermore, embodiments described herein may be used and combined in any suitable manner.

The invention claimed is:

1. A method performed by a control unit for handling failures in an autonomous vehicle, the method comprising, by a processor of the control unit:

detecting a failure in the autonomous vehicle, wherein the failure is detected by at least one of:

a set of sensors in the autonomous vehicle, receiving an indication from another vehicle observing that there is a failure with the autonomous vehicle, or receiving an indication from a weighing station detecting that the autonomous vehicle is overloaded;

determining whether the autonomous vehicle is in an open road area or in a restricted area, wherein the restricted area is isolated from the open road area, and the restricted area is associated with a restricted area configuration for the autonomous vehicle, wherein the restricted area configuration:

provides a higher degree of freedom of handling failures than in an open road configuration, and/or relate to higher maximum speed limits when operating in the restricted area than in than the open road configuration, and wherein determining whether the autonomous vehicle is in the open road area or in the restricted area comprises at least one of:

comparing a position of the autonomous vehicle to a map and/or coordinates indicating the restricted area, or comparing the position of the autonomous vehicle with a geofence of the restricted area and/or the open road area;

wherein the position is determined by using at least one satellite and/or the set of sensors;

when the autonomous vehicle is determined to be in the restricted area, handling the failure according to a restricted area configuration, wherein handling the failure according to the restricted area configuration comprises determining whether a predetermined safety condition is fulfilled, and when the predetermined safety condition is determined to be fulfilled, allowing the autonomous vehicle to leave the restricted area, wherein allowing the autonomous vehicle to leave the restricted area comprises at least one of:

triggering an opening of a gate between the open road area and the restricted area, or reconfiguring the autonomous vehicle.

2. The method according to claim 1, wherein detecting the failure in the autonomous vehicle further comprises obtaining failure status information, and wherein determining whether the predetermined safety condition is fulfilled is based on the obtained failure status information.

3. The method according to claim 2, wherein the failure status information indicates a severity level of the detected failure, and wherein the predetermined safety condition is considered fulfilled when the severity level of the failure is below a predetermined threshold.

4. The method according to claim 2, wherein the failure status information indicates a critical time and/or critical distance of operating the autonomous vehicle until the severity level of the failure is expected to increase, and wherein the predetermined safety condition is considered fulfilled when a drive plan of the autonomous vehicle is scheduled to finish before the indicated critical time and/or critical distance.

5. The method according to claim 1, further comprising:

obtaining a vehicle status information, wherein determining whether the predetermined safety condition is fulfilled is based on the obtained vehicle status information.

6. The method according to claim 5, wherein the vehicle status information indicates a current weight of the autonomous vehicle, and wherein the predetermined safety condition is considered fulfilled when the current weight is below a predetermined weight threshold.

7. The method according to claim 5, wherein the vehicle status information indicates a current tire pressure of the autonomous vehicle, and wherein the predetermined safety condition is considered fulfilled when the current tire pressure is above a predetermined tire pressure threshold.

8. The method according to claim 5, wherein the vehicle status information indicates a current fuel and/or battery level, and wherein the predetermined safety condition is considered fulfilled when the current fuel and/or battery level is/are above at least one predetermined fuel and/or battery level threshold.

9. The method according to claim 1, wherein handling the failure according to the restricted area configuration comprises determining one or more driving parameters for the autonomous vehicle with a higher degree of freedom compared to handling the failure according to an open road configuration.

10. The method according to claim 1, wherein, when the predetermined safety condition is determined to not be fulfilled, the method comprises restricting the autonomous vehicle from leaving the restricted area.

11. The method according to claim 10, wherein, when the predetermined safety condition is determined to not be fulfilled, the method comprises determining one or more driving parameters for the autonomous vehicle based on a severity of the detected failure.

12. A control unit configured to, by a processor of the control unit, perform the method according to claim 1.

13. An autonomous vehicle comprising the control unit according to claim 12.

14. A non-transitory computer program medium carrying a computer program comprising program code for performing the steps of claim 1 when said program code is run on a computer.

* * * * *